G. W. HAZEL.
HAND TOOL.
APPLICATION FILED MAR. 21, 1914.
1,305,899.
Patented June 3, 1919.
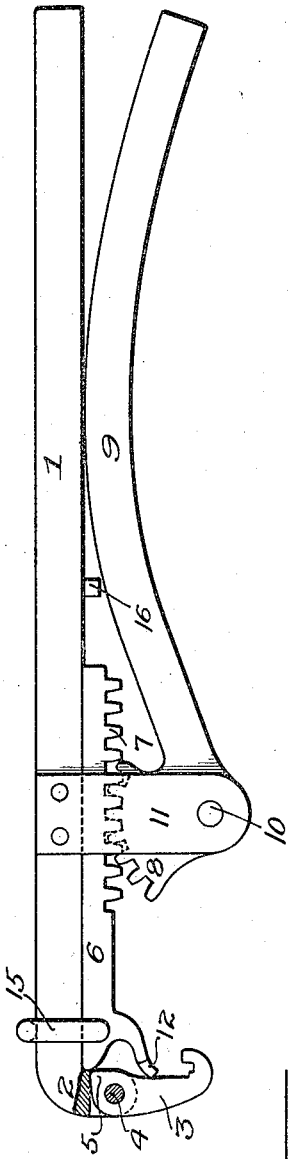
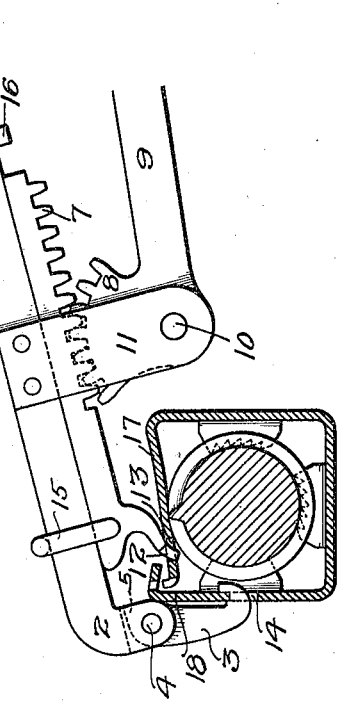
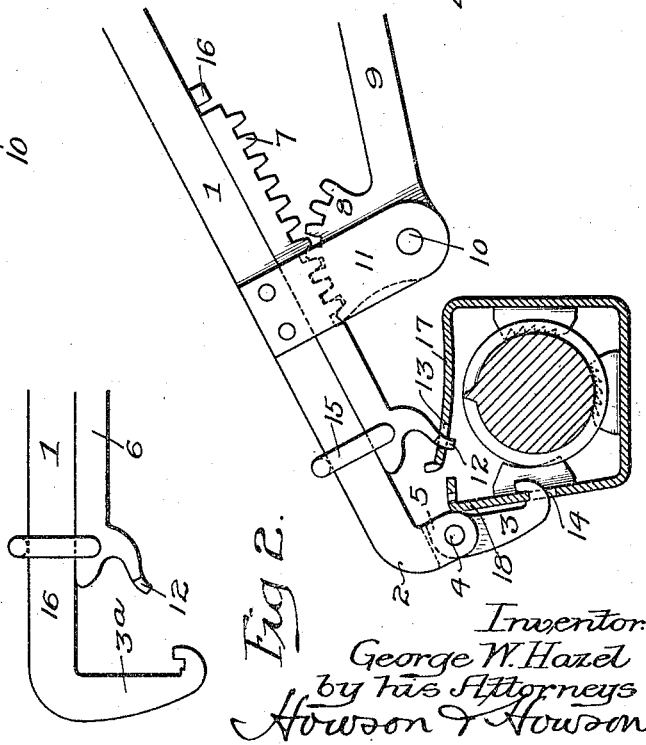
Witnesses
Inventor:
George W. Hazel
by his Attorneys
Howson & Howson

UNITED STATES PATENT OFFICE.

GEORGE W. HAZEL, OF CAMDEN, NEW JERSEY, ASSIGNOR, BY MESNE ASSIGNMENTS, TO HAZEL SAFETY NUT COMPANY, OF PHILADELPHIA, PENNSYLVANIA, A CORPORATION OF DELAWARE.

HAND-TOOL.

1,305,899.  Specification of Letters Patent.  Patented June 3, 1919.

Application filed March 21, 1914. Serial No. 826,228.

*To all whom it may concern:*

Be it known that I, GEORGE W. HAZEL, a citizen of the United States, and a resident of Camden, Camden county, New Jersey, have invented an Improved Hand-Tool, of which the following is a specification.

My invention relates to hand-operated tools, and consists of an improved form of tool more particularly designed and intended for applying and removing spring nuts or spring lock nuts such as set forth in my application for patent filed May 13, 1913, Serial No. 767,351.

The spring nut or lock nut shown and described therein comprises a shell having portions adapted to the threads of a bolt and encircling the latter, with disconnected ends which are connected when the nut is applied to the bolt. Being of spring metal they require a certain amount of compression before they can be connected together around the bolt. In like manner, it is necessary to effect a similar compression when removing the spring nut or lock nut from the bolt, and the tool which I have devised is designed to accomplish this work in an efficient and satisfactory manner.

These and other features of my invention are more fully described hereinafter, reference being had to the accompanying drawings, in which:

Figure 1, is a view in elevation, partly in section, of my improved tool;

Fig. 2, shows the position of the tool in the act of applying to a bolt a nut of the type referred to;

Fig. 3, shows the position of the tool in the act of removing a nut, and

Fig. 4, is a view illustrating a modification of my invention.

In the drawings, 1 represents a bar substantially straight throughout its length, having its end turned at 2, with a hook member 3 pivotally attached at 4 to said end; the latter being slotted for the reception of said hook, which is preferably provided with a cam 5 so that it can not move farther inward, or in a direction to the right in the position illustrated, than as shown in Fig. 1.

Slidably disposed with respect to the bar 1 is a second bar 6, having teeth 7 forming a rack for engagement by a segment 8 carried by a handle 9 pivotally connected at 10 to arms 11 carried by and extending from the bar 1. The arms may be integral with the bar instead of separate members connected thereto. The bar 6 is provided with a projection 12, which may be downwardly curved, for engagement with an aperture 13 in one wall of the nut for coöperative action with the end of the hook 3, which hook engages an aperture 14 in another wall of the nut, as shown in Figs. 2 and 3. By preference, the bar 6 is provided with means at its forward end, which may comprise a strap 15 encircling the bar 1, whereby said bar 6 may be guided with respect to the bar 1; being also guided by the arms 11 to which the handle 9 is pivoted, and the bar 1 has a stop 16 limiting the rearward movement of the bar 6. This stop may be adjustable or disposed in different positions so as to give said bar 6 different ranges of movement for different sized spring nuts or lock nuts.

The nuts have the apertures 13 and 14 in the wall of their shells for engagement by the end of the hook 3 and the projection 12, respectively, and in the act of applying and removing the nut, the action is to compress the same whereby the coöperative connecting ends 17 and 18 of said nut may engage in the one instance, and be disengaged in the other, as clearly shown in Figs. 2 and 3.

In some instances, the bar 1 may carry a hook 3ª integral therewith, as shown in Fig. 4, obviating the necessity of employing the pivoted hook shown in Figs. 1, 2 and 3.

I claim:

1. A tool comprising a bar, a hook pivotally mounted on the end of the same, and a cam carried by said hook to limit its inward movement, a coöperating member slidably mounted with respect to said bar and having a projection on the end nearest the hook, said projection pointing toward said hook, and means for actuating said coöperating member in a line parallel to said bar, to bring its projection into operative position with respect to said hook.

2. A tool comprising a bar, a hook pivotally mounted at one end of the same, means for limiting the movement of said hook in one direction, a coöperating member slidably mounted with respect to said bar, said member having a projection on the end thereof nearest the hook, and pointing toward said hook, said member being provided with teeth at its opposite end to form a rack, a handle pivoted to the bar, and a toothed segment carried by said handle for engagement with said rack to move said member in line with the bar into and out of operative position with respect to said hook.

In testimony whereof I have signed my name to this specification, in the presence of two subscribing witnesses.

GEORGE W. HAZEL.

Witnesses:
MURRAY C. BOYER,
WM. A. BARR.

Copies of this patent may be obtained for five cents each, by addressing the "Commissioner of Patents, Washington, D. C."